June 11, 1940.  P. F. K. ERBGUTH ET AL  2,204,531
SAFETY CONTROL FOR VULCANIZER PRESSES
Filed May 26, 1937   3 Sheets—Sheet 2

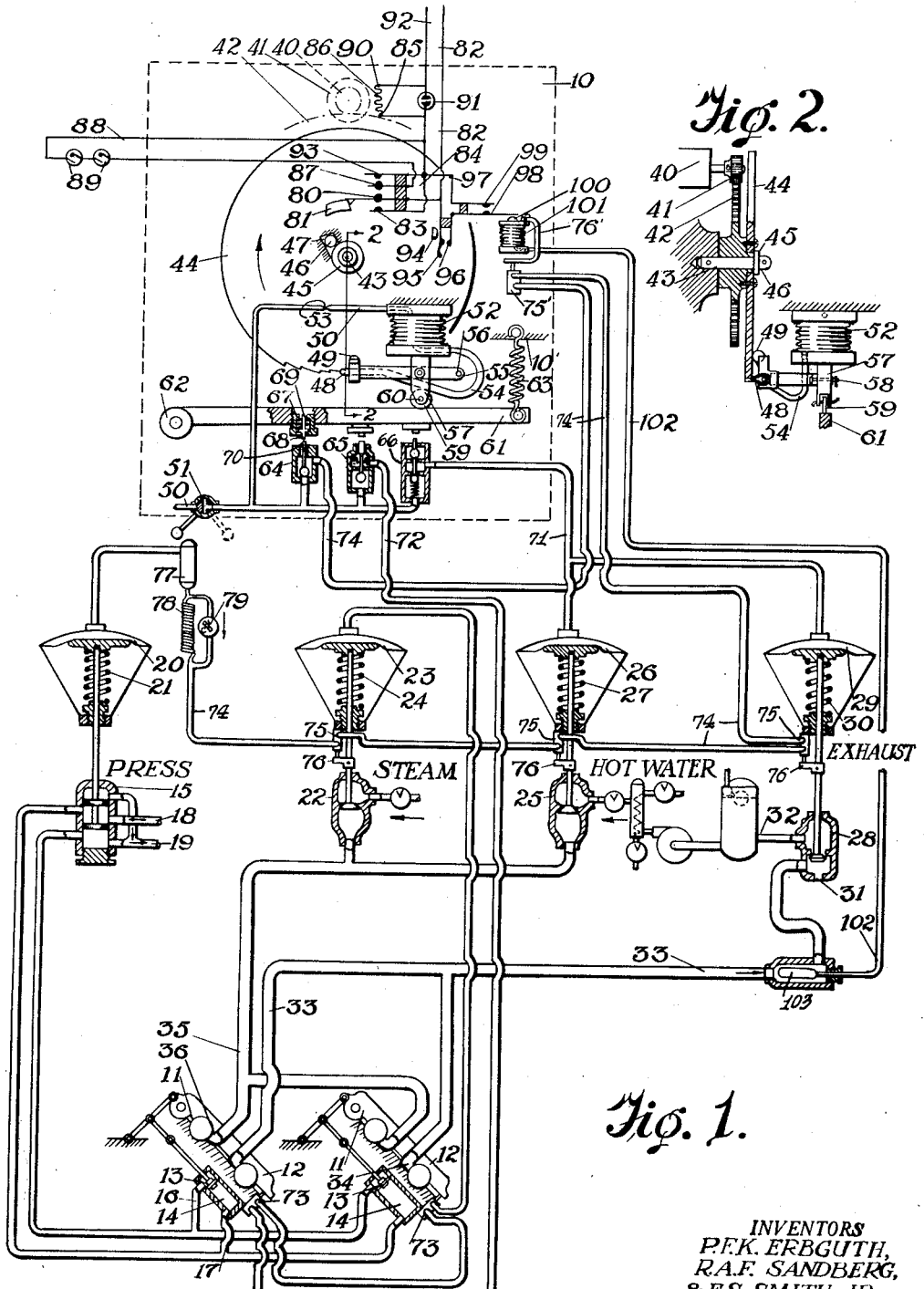

INVENTORS
P. F. K. ERBGUTH,
R. A. F. SANDBERG,
E. S. SMITH, JR.
BY ATTORNEYS

Patented June 11, 1940

2,204,531

UNITED STATES PATENT OFFICE 2,204,531

SAFETY CONTROL FOR VULCANIZER PRESSES

Paul F. K. Erbguth and Rolf A. F. Sandberg, Brooklyn, and Ed S. Smith, Jr., St. Albans, N. Y., assignors to Charles J. Tagliabue Mfg. Co., Brooklyn, N. Y., a corporation of New York Application May 26, 1937, Serial No. 144,820

16 Claims. (Cl. 18—17)

This invention relates to timers for controlling the cycle of operation of individual vulcanizer presses for hollow tires so as to secure the maximum safety both of the operators and of the mechanical elements of such presses. It particularly relates to arrangements wherein one such timer controls the operation of two, or more, such presses. This invention further relates generally to improvements in the cycle controller itself.

A particular object of the invention is to provide a controlling system with safety interlocks that function to give a reliability of operation, increased efficiency and safety hitherto unobtainable in this art. In the broadest aspect of the invention we attain these objects by governing the opening of the press or presses in accordance with the position of the various power-operated valves.

We have further simplified such an interlocking arrangement by utilizing the air-pressure to the diaphragm-tops, where the valves are air-operated, as is ordinarily the case with industrial vulcanizers. It has long been a problem in the art to provide a cycle controller, that must run through a rigidly predetermined sequence of operations, with a simple means to make it follow sudden changes at short but definite intervals. Others have attempted to solve this problem by methods that introduced into the system and vulcanizing apparatus undesirably complex and inordinately numerous mechanical parts.

We also have provided a number of improvements in such a combination which have been found desirable in reducing it to commercial practice, the objects of which will appear more particularly hereinafter.

As regards safety of operation, it is axiomatic that a control system must be safe either when automatically or when manually operated. Our broadly new controlling apparatus is by no means a mere aggregation of old elements since we have modified the arrangement and organization of our controlling system so as to obtain increased safety. To graphically illustrate the difficulties involved in providing a safety system for such vulcanizing presses, which constitute, essentially, parts of a hydraulic equipment system, comparison may well be made to the organization of the human body wherein surgical technique is too frequently required to cure trouble with the gall bladder and the vermiform appendix: typical examples of a hydraulic system including a side connection without through-flow, to a conduit having a fluid flowing straight through the same. Such side connections, by reason of their inherent characteristic of constituting a perpetual source of trouble due to accumulations in the non-flowing passage, are rejected in sewer construction and are the cause of more than their generally-expected share of the failures of hydraulic equipment. In connection with presses, we are aware that others have provided such a side connection to a pipe from the bag or interior of the tire so as to actuate a pressure-responsive means. Such devices are frowned upon by engineers concerned with their reliability of functioning, as briefly indicated above.

We have provided means in the straight-through passage that is responsive to the temperature therein rather than to the pressure of the medium flowing therethrough. It has been found that the risk of injury to an operator of an individual vulcanizer press is from the temperature, rather than pressure, of hot circulating water; in other words, operating hazards arise, not from pressure, but from temperature of the circulating medium. In our improved system, we consequently provide temperature-responsive means connecting the exhaust from the bag of each press with our timer. Since our temperature responsive means is normally of the bulb and bellows type interconnected by tubing, the whole system contains a pure and clean fluid, the vapor pressure of which is a measure for the temperature, thus ordinarily eliminating any possibility of failure in the connection between the press and the timer, with a resultant increase in the certainty of operation. Further, by the use of a gas-filled system, or a solid filled system, a single bellows may be made responsive to the average temperature of two bulbs, so that one bellows may be used, if desired, for governing the operation of both presses. The pressure and temperature as used herein are not mere equivalents since the relation between them is not fixed, i. e., one does not uniquely correspond with the other, except for a saturated vapor, the use of which as a vulcanizing fluid is not customary or contemplated in such vulcanizer presses. Besides this, our preferred system is believed by us to be more certain in its operation and follows a different method generally than does any system heretofore existing in this art.

These and other objects of our invention will appear to those skilled in the art from the accompanying drawings and specification, in which are illustrated and described specific embodiments of our invention. It is our intention to claim all that we have disclosed that is new and useful.

In the following figures, wherein like characters of reference indicate like parts throughout:

Fig. 1 is a somewhat diagrammatic front elevation of the electrical, pneumatic and hydraulic circuits and their associated operative members, including a cam, for the preferred embodiment of our safety method utilizing the positions of various valves, and shown for a timer governing two presses;

Fig. 2 is a corresponding, somewhat diagrammatic, side elevation, partially in section;

The description of the equipment and its operation is in the order of the following resumé:

A. General description;

B. The preferred embodiment of our invention, utilizing valve positions for safety, referring to Figs. 1–5; and C. A simplified embodiment utilizing air-pressures on the diaphragms for such valves, see Fig. 6.

Throughout the description, it must be remembered that there are three conditions of operation; (1) normal, (2) manual, and (3) for weekends, or other protracted periods of plant inactivity, during which the presses are closed but do not then contain tires.

A. General description

Before proceeding with the detailed description, it is believed helpful to give the following brief general description to make clear the functioning of the various operating parts.

In the figures, each "individual tire mold press" is hydraulically actuated by a piston governed by a reversing valve which is air-operated by a spring-opposed diaphragm. After both presses are closed, steam is admitted to each interior of the hollow tire on one side and is simultaneously exhausted to a drain from its other side by valves which are likewise air-operated by spring-opposed diaphragms. After the air is blown out, the steam is shut off and hot water is circulated through the tire and returned by a 3-way exhaust valve to the circulating system instead of to a drain. The timer controls, by a single cam, the sequential operation of the air-valves for the several diaphragms. This cam positions a single controlling member that operates these air-valves to give the desired sequence of operations according to the various displacements of this member. The cam is rotated by a self-starting synchronous motor precisely one revolution in one complete cycle of operation.

With the timer of Fig. 1, the attendant simultaneously presses two push-buttons causing the cam to move one step forward, after which it cannot be moved further by hand, so that the press closes, after which steam is admitted to the interior of the tire. As soon as the steam heats a temperature-responsive bulb in the exhaust, a bellows connected with such bulb closes a switch to start the timer which closes its running switch if the press is closed, as it then must be, since the steam valve is interlockingly connected with the press by movable-mold operated air-valves.

Figure 6:
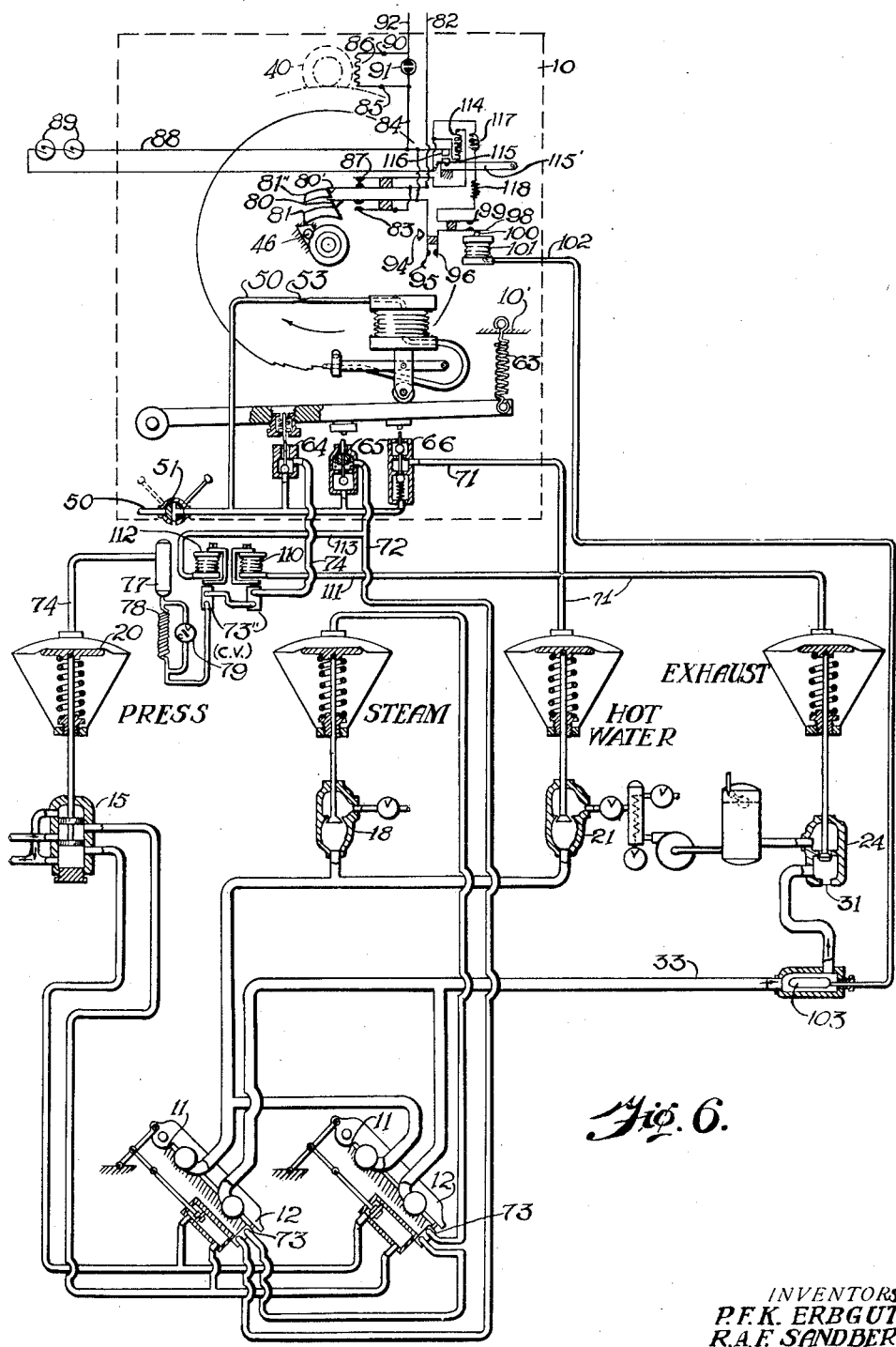
Fig. 6 is a view, generally similar to Fig. 1, but for a simplification of our improved safety method, utilizing the air-pressure of the various diaphragms used for operating the valves associated with the press.

With the timer of Fig. 6, the attendant starts the timer as before by simultaneously pressing two push-buttons, causing the cam to run steadily forward so that each press closes, after which steam is admitted to the interior of the tire. The running switch of the timer acts so as that the timer will stop unless the temperature of the exhaust has risen after a predetermined interval following the manual starting of the timer, failure to rise ordinarily being due to the absence of a tire from either press or failure to close either of the molds. However, in the normal operation of the timer of Fig. 6, the timer will run continuously throughout the cycle. While this permissive feature is similar in some respects to that shown in the Bast et al. Patent No. 1,959,336, we have applied the teachings thereof, for a pot heater containing a number of tires, in a novel manner to the individual mold presses which face a different and unique problem: that of safely governing the opening of such presses, which new result we attain with our improved system.

The steam, therefore, cannot be introduced until after the press has been closed. If, for any reason, the timer stops, this is indicated by the running light on top of the instrument. As long as the press is closed, steam and hot water may be admitted to the interior of the tire, and the exhaust is connected to either drain or circulate. Whenever the steam or hot water supply valve is open, or the exhaust valve is connected to the circulation line, it is impossible for air to reach the diaphragm for the hydraulic reversing valve, so that this is spring-held in the press-closing position. Consequently, failure of the air-supply cannot cause the press to open. At the end of the cure, the timer shuts off the flow of hot water, admits steam to blow out of the hot water to the exhaust, and then stops the flow of steam at the exhaust opening. In Fig. 1, after the exhaust temperature has dropped to a safe value, the switch actuated by this temperature opens each press, the timer having previously stopped when the cam has made one complete revolution. In Fig. 6, each press opens after a predetermined interval following the closure of both steam and hot water supply valves and the opening of the exhaust valve to drain. Another difference, previously mentioned, between the systems of Figs. 1 and 6 is that in Fig. 1 the actual positions of the valves are used to govern the opening of each press; while, in the system of Fig. 6, the air-pressure to the diaphragms operating these valves is relied upon.

B. Preferred embodiment

In Fig. 1, a single timer 10 controls a pair of individual tire vulcanizing presses 11, each press having a movable mold 12 operable by hydraulic piston 13 in its cylinder 14. The opening and closing ends of hydraulic cylinder 14 are connected with reversing valve 15 therefor by opening and closing lines 16 and 17 respectively. Hydraulic pressure supply line 18 is connected to the reverse valve as is its exhaust hydraulic line 19. Reversing valve 15 is positioned by air-operated diaphragm 20 opposed by spring 21. Steam supply valve 22 is likewise positioned by its air-operated diaphragm 23 opposed by spring 24, this valve being of the spring closed type as is also hot water supply valve 25 with its air-operated diaphragm 26 opposed by spring 27. Exhaust valve 28 is air-operated by diaphragm 29 opposed by spring 30. This valve is of the 3-way type for selectively connecting the exhaust with drain 31 or with the circulating line 32 connected back to the inlet of hot water valve 25, the exhaust line 33 from the interior of the tires being connected therewith at 34. Inlet line 35 is attached to the interior of the tires at connection 36 to connect steam and hot water valves 22 and 25 with the interior of each of the tires by its inlet connection 36.

In timer 10, an electric motor 40 of the self-starting synchronous type drives interchangeable gears 41 and 42, and shaft 43, to which disc cam 44 is attached normal to the axis of shaft 43. Cylinder hub 45 of the cam has braking ball 46 movable vertically in a fixed groove 47 so that the cam can turn freely only in a forward direction, i. e., clockwise in Fig. 1. The periphery of cam 44 is made up of circular portions of different radii corresponding with the desired operations. Air nozzle 48 has ball 49 attached thereto to act as a sled-runner and thus space the end of air nozzle 48 just clear of the front surface of the cam so that it cannot hinder the motion thereof. Air-supply line 50 contains cock 51, normally open. Bellows 52, connected to air-supply line 50 is fixed at its upper end, the lower end being free to expand downwardly with an increase of air-pressure therein. Feed resistance 53 is located in the air-supply line just upstream of the bellows. Flexible air-line 54 connects the interior of bellows 52 with nozzle 48, which nozzle is attached to the lefthand end of lever 55, which is pivotally mounted on pin 56 to the frame 10' of timer 10 and to the depending portion 57 of bellows 52 by pin 58 attached thereto so that the motion of the bellows results in a corresponding magnified motion of nozzle 48. Roller 59 is rotatably mounted on pin 60 also attached to the lower end of depending portion 57 of bellows 52. Control lever 61 is pivotally mounted at its lefthand end on pin 62 which is attached to timer frame 10', the righthand end being biased upwardly by tension spring 63, the upper end of which is likewise attached to timer frame 10'. Roller 59 attached to the bottom portion of bellows 52 presses against the upper edge of control lever 61 to position it according to the then working edge of cam 44. Bumpers on the lower edge of control lever 61 coactingly abut air-valves 64, 65 and 66 respectively for operating the reversing valve 15 for the presses, steam valve 22 and hot water valve 25. Adjustable bumper head 67 having sliding pin 68 biased downwardly by spring 69, is provided for each of the air-valves so that the lower end of sliding pin 68 may abut the corresponding stem 70 of each of air-valves 64, 65 and 66. Each air-valve is connected with air-supply line 50 downstream of cock 51. Air-valve 66 is connected by line 71 to diaphragms 26 and 29 respectively of hot water valve 25 and exhaust valve 28, air-valve 66 being of the reverse acting type so that line 71 is normally disconnected thereby from air-supply line 50 and, when stem 70 of air-valve 66 is depressed, the air-pressure reaches line 71 from air-supply 50. Line 72 connects air-valve 65 with diaphragm 23 of steam valve 22. This air-line 72 contains reverse-acting air-valves 73 which are closed except when movable molds 12 of presses 11 are closed, at which time these air-valves 73 connect control air-valve 65 with diaphragm 23. Line 74 connects air-valve 64 with diaphragm 20 of hydraulic reversing valve 15. This line 74 contains reverse-acting air-valves 75, each actuated by its bracket 76, one of each being attached to the stem of each of valves 22, 25 and 28 so that diaphragm 20 of the press reversing valve 15 is connected with air-valve 64 only when both steam and hot water valves 22 and 25 are closed and exhaust valve 28 simultaneously connects exhaust line 33 with drain 31, after which it is safe for each press to open. Line 74 also contains capacity tank 77 with series-resistance 78 and check valve 79 shunted around resistance 78 so that each press closes quickly and promptly and opens slowly and in a delayed manner.

To operate electrical motor 40 of timer 10, an electrical system is provided as follows: blade 80 is biased downwardly so that its end portion may abut stud-cam 81 on the face of cam 44. Blade 80 is connected to one line 82 of the current supply. Blade 80 opens from running-blade 83 when stud-cam 81 raises the end of blade 80. Running blade 83 is connected by wire 84 with the lower terminal 85 of coil 86 of motor 40. The running of motor 40 turns cam 44 so that its stud-cam 81 raises blade 80 to close against starting blade 87, which is connected by wire 88, containing two push-buttons 89 (giving two-hand "safety" starting), with lower terminal 85 of motor-coil 86. The upper terminal 90 of coil 86, which is shunted through neon-light 91, is connected with line 92 which, like line 82, is connected with the current supply source. When blade 80 is raised slightly more by its stud-cam 81, blade 80 will cause blade 87 to contact upper blade 93, which is also connected by wire 84 to lower terminal 85 of motor coil 86 so that a momentary simultaneous push of the two button switches 89 will suffice to positively cause motor 40 to continue to run long enough to drive stud-cam 81 clear of blade 80 thus bringing cam 44 to a position where the presses close and, upon such closure, steam supplied to the tires. In this position blade 80 clears both of its adjacent blades 83 and 87 so that the motor is certain to remain still. At this time, stud-cam 94 abuts the end portion of blade 95 thus causing the latter to make contact with blade 96, which is connected by wire 97 containing blades 98 and 99, and wire 84 to lower terminal 85 of motor coil 86 so that, when switch blades 98 and 99 are closed, motor 40 starts, thus moving cam 81 clear of the end of blade 80 so that blade 80 contacts blade 83, which closes the running circuit of motor 40 and disconnects the starting circuit 97 including switch blades 98 and 99 until the next cycle of operation subsequent to the manual and simultaneous closing of both switches 89.

Upper end 100 of bellows 101 is movable, being connected by temperature-responsive tube 102 with bulb 103 in the exhaust line so that the presence of steam or hot water in exhaust line 33 causes bellows end 100 to rise to a position corresponding with the then temperature of the exhaust, which closes blades 98 and 99 to cause motor 40 to start, assuming that blades 95 and 96 are then closed by stud-cam 94. Air-valve 75', inverted but otherwise identical with air-valves 75 actuated by the valve stems, has its U-shaped yoke-stem 76' affixed to upper portion 100 of bellows 101. With a low temperature in exhaust line 33, bellows 101 contracts, thus lowering its upper end 100, and hence stem 76', to form a through-connection of line 74. When the temperature in exhaust line 33 is high, bellows 101 is expanded, its end 100 and stem 76' are raised and line 74 is opened to atmosphere so that the press must then infallibly stay closed, and cannot be opened unless the temperature again drops.

*Normal operation.*—The operation of our device shown in Fig. 1 through a complete normal cycle is as follows: The attendant puts a tire in each press 11 and presses both push-buttons 89 so located that the attendant is safely clear of both presses. This starts motor 40 of timer 10 which then runs cam 44 one step forward, at which time stud-cam 81 lets blade 80 clear both of its contacts 83 and 87. Both presses close, connecting air line 72 through reverse-acting valves 73 to diaphragm 23 of steam valve 22, which then opens. As soon as the steam reaches bulb 103 in exhaust line 33, bellows 101 expands, thus causing blades 98 and 99 to contact and thereby complete the starting circuit through wire 97 and blades 95 and 96, to start motor 40. Soon after this, stud-cam 81 clears blade 80, so that blade 80 contacts blade 83, thus causing the timer to run out its complete cycle. During this cycle, cam 44 first increases its radius progressively and then decreases it progressively to cause the following sequence of operations, according to the identified steps of cam 44.

| Time | Function | | | | Air pressure | | | |
|---|---|---|---|---|---|---|---|---|
| | Pr. | St. | HW | Ex. | Pr. | St. | HW | Ex. |
| —0— —0— | Op. | Off | Off | Dr. | On | Off | Off | Off |
| —1— * —6— | Cl. | Off | Off | Dr. | Off | Off | Off | Off |
| —2— —5— | Cl. | On | Off | Dr. | Off | On | Off | Off |
| —3— —4— | Cl. | Off | Off | Dr. | Off | Off | Off | Off |
| | Cl. | Off | On | Cr. | Off | Off | On | On |

0  2  3  55  56  59  60=Minutes

\* Steps on cam.

| Air-valves for: | Presses: | Exhaust: |
|---|---|---|
| Pr. Operating press, St. Steam, HW Hot water, and Ex. Exhaust | Op. Open, and Cl. Closed. | Dr. Drain, and Cr. Circulating line |

Figure 3:
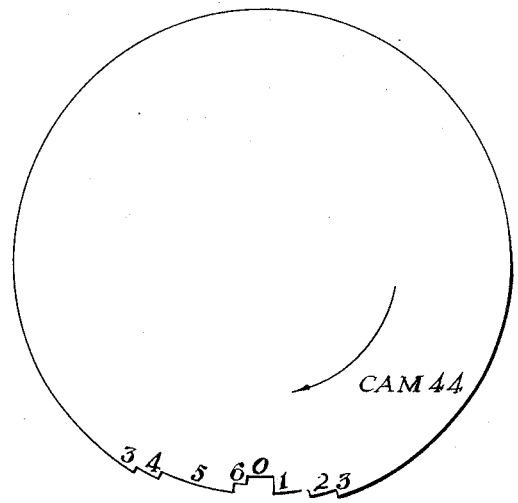
Fig. 3 is a front view of the cam itself.
Figure 4:
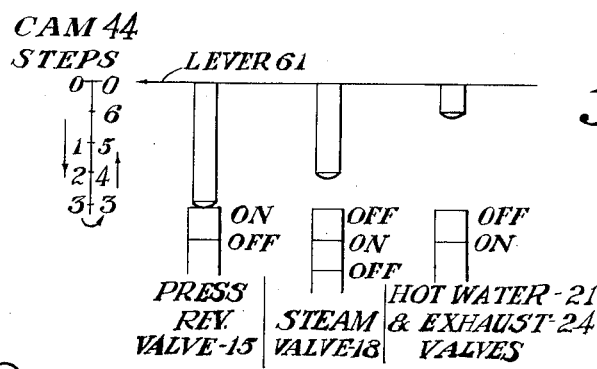
Fig. 4 is a graph, the lefthand portion of which shows the position of the control lever related with time for a typical cure, and the righthand portion of which shows diagrammatically the arrangement of the air-valves and their operating bumper heads.

Figs. 2, 3 and 4 show our improved means for and method of operating a number of air-valves quickly, reliably and in the complex manner required. Fig. 4 is readily understood by reference to the above table. In this figure, control lever 61 is shown in its zero position, the corresponding position for the various steps of the cam being identified on this figure by the numbers of reference for such steps. In Fig. 3, these numbers appear on the face of the cam.

From the foregoing, it should be apparent that the bellows 52 will force small air-nozzle 48 to such a position that it substantially splits the working edge of cam 44 at all times as long as air is supplied through line 50. Thus the radial changes of cam 44 in Fig. 3 are immediately followed correspondingly by the lower end of bellows 52 and control lever 61. Due to this reducing lever arrangement, these radial steps on the cam are sufficiently large that the job of manufacturing such a cam is not delicate and expensive as heretofore has been the case where the reduced motion disclosed herein has not been used.

Figure 5:
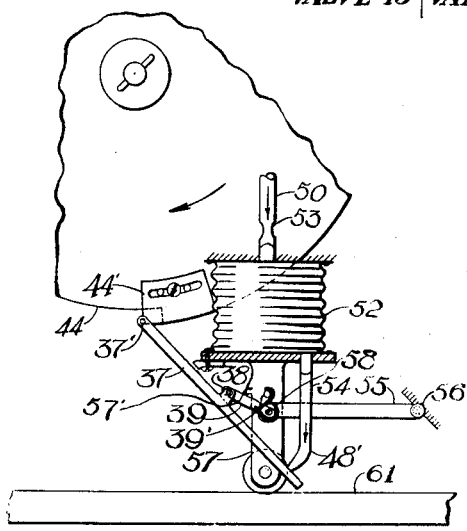
Fig. 5 is a somewhat diagrammatic front elevation of an improved form of the bellows and nozzle arrangement having an added flapper.

In Fig. 5, an alternative form of a detail of our invention is shown which has certain practical advantages. Nozzle 48 is replaced by nozzle 48' and cam 44 has segment 44' angularly adjustable thereon; the arrangement of bellows 52, guide link 55, anchor pin 56, restraining pin 58 for depending portion 57 being substantially as before. However, flapper 37 is pivotally mounted by pin 38 on floating link 39, which has spring 39' for tensioning it to normally abut stop portion 57' of depending portion 57 of bellows 52. The operation of this portion of our device is as follows: the pressure of the air from bellows 52 flowing through line 54 to nozzle 48' blows against the righthand end of flapper 37 to blow this away from its nozzle 48', thus causing the lefthand pin end 37' of flapper 37 to press against the working edge of cam 44 in a radial direction or the edge of cam segment 44' in a circumferential direction. The gap between nozzle 48' and its flapper 37 determines the air-pressure within bellows 52 so that its depending portion 57 accurately follows the working edge of cam 44 and its segment 44' even for sudden rises or drops. In case the air-supply to bellows 52 should fail while the motor 40 still operates the timer cam 44, it is shown by this figure that link 39 and its biasing spring 39' permit this motion without interference with the running of the timer; in other words, flapper 37 can then be pushed readily out of the way of cam 44 by the cam itself.

While this general method of obtaining a pre-determined sequence of operations from a progressive movement of a member is not broadly new, the appended claims bring out what we consider to be the points of novelty. At the end of the cycle, enough time is allowed by the cam to permit both the temperature and pressure to fall to safe values so that the presses can be safely opened. It will be clear that by reason of the interlocking arrangement of the reverse-acting air-valves operated by the stems of the steam, hot water, and exhaust valves and the temperature-responsive bellows, the presses cannot be opened as long as it would be dangerous to have them opened; the capacity tank 71 and its cooperating check-valve 79 shunted resistance 78 in the line to the press reversing valve together prevent the opening of the presses for an interval after the steam, hot water and exhaust valves are all in a safe position.

During normal operation, the failure of the attendant to put a tire in each press would cause the motor to stop at this point of the cycle after steam had been admitted, since steam would then escape from the empty press and would not reach bulb 103 in exhaust line 33, so that the timer would not continue running.

*Manual operation.*—It is apparent that protection exists even though the cam 44 be manually turned by the attendant at too high a high speed to allow a safe interval for the temperature and pressure to be dissipated following the opening of the exhaust and the shutting off of both hot water and steam.

*Week-end operation.*—For week-end operation, the attendant merely closes cock 51 on the air-supply line. Both presses then close and remain closed. When normal operation is to be resumed after such a protracted interval as a week-end, the attendant merely opens the air-supply cock and the presses both open, ready for normal operation. If the attendant should inadvertently start the timer while the air-supply cock is closed by pressing the two button switches, the timer would run only a short while, i. e., until stud-cam 81 ran along far enough relative to blade 80 to bring the motor to a stop. Since no air is being supplied, the bellows can not move the control lever downwardly, with the result that steam or hot water could not possibly be admitted. The attendant would then manually turn cam 44 to its starting position before the presses can be again operated.

It is thus seen that our improved timer is safe under any condition of operation, using the above described system.

C. Simplified safety system

In the modified system illustrated in Fig. 6, the pressure of the diaphragms is relied upon for safe operation instead of the actual positions of the hot water and exhaust valves and the steam valve respectively; thus bellows 110 is connected with air-line 71 (for the hot water and exhaust valves) by pipe 111, while bellows 112 is connected with line 72 (for the steam valve) by pipe 113. A reverse-acting air-valve 73″ is located just below each bellows 110 and 112 so that each is through-connected when there is no air-pressure (relative to atmosphere) in each bellows. Line 74 connects air-valve 64 through air-valves 73″, resistance 78, having check-valve 79 in shunt therewith, and capacity tank 77 to diaphragm 20 for press-reversing valve 15. The operation is generally as before: diaphragm 20 is connected with the atmosphere by reverse-acting valves 73″ except when there is no pressure in lines 72 and 71, respectively for the steam valve and the hot water and exhaust valves, so that the presses cannot be opened until an appreciable interval has elapsed after the steam and hot water have both been shut off and the exhaust connected to the drain.

In Fig. 6, we show a slightly different arrangement for starting from that shown in Fig. 1. In Fig. 6, we also provide an additional stud-cam 81″ so located relative to blade 80′ of a separate starting switch, the fixed blade of which is blade 87, that starting-switch blades 80′—87 close before running-switch blades 80—83 are separated at the end of a cycle. In Fig. 6, stud-cam 81 is of such a length and so located relative to stud-cam 81″ that stud-cam 81″ will not only have closed blades 80′—87 before opening blades 80—83 at the end of a cycle but will cause blades 80′—87 to separate before cam 81 brings blades 80—83 to again contact each other. Starting switch blades 80′—87 are in series with the two button starting switches 89 in line 88. Holding coil 114 is in series with starting switch blades 80′—87, and its contacts 115—116 are in shunt with the two button starting switches 89, contact 115 being operated by armature 115′ and its holding coil 114. From the foregoing and the figure, it is clear that the arrangement is such that a momentary simultaneous pushing of the two button switches 89 is effective to start the cycle of operation only while stud-cam 81″ forces blade 80′ against blade 87, in other words at the beginning of a cycle to start the same. In any case, the attendant can tell from running-light 91 whether or not the timer has started upon its cycle of operation.

Motor 40 then operates the timer until cam 81″ rides out from under blade 80′ to disconnect the same from blade 87. The motor then continues to run only if switch blades 95—96 and 98—99 are closed respectively by stud-cam 94 and bellows 101 which closure occurs in normal operation. If, however, the temperature of bulb 103 is not sufficiently high to close blades 98—99 before blade 80 runs off of cam 81, relatively speaking, armature 115′ will drop so that motor 40 will stop. If the temperature of bulb 103 should subsequently rise enough to cause bellows 101 to close contacts 98—99, this will not cause motor 40 to run since resistance 118 in series with coil 117 is so high that the pull of coil 117 on armature 115′ is not sufficient to raise the same although adequate for holding it once it has been raised. In other words, this is a "permissive" system of operating a timer for individual presses.) After the timer has thus stopped, due to the failure of steam to reach bulb 103 at the proper moment, it is necessary for the attendant to manually raise armature 115′ to restart the timer. Its failure to operate within the proper time indicates defective operation of some part of the mechanism so that the attendant would look for the source of trouble before manually closing the switch. Experience has shown that the cure is ordinarily not sufficiently advanced to spoil the tire at this time.

We do not wish to be restricted to air-operation of the timer and its associated presses and their valve-operating means. The systems that we have taught would function equally as well with, e. g., electrical operation.' Also in the system of Fig. 1, we may use reverse-acting air-valve 75′ alone in line 74 between air-valve 64 and diaphragm 20. Similarly, we may use one or more air-valves 75 each actuated by the stem of its steam, hot water or exhaust valve, as the case may be. Similarly, we may choose in certain cases to rely only upon capacity tank 77, with or without its related resistance 78 and shunting check valve 79. We will not burden this specification further by discussing other useful combinations of the disclosures herein, such as will be evident to anyone skilled in this art. In explanation of the word pilot a small air valve "governing the operation of a large one" is a pilot. A switch is likewise a recognized pilot means when used to govern a motor for controlling a variable. The word "pilot" means to guide. When a small valve, e. g., is used to govern (guide) a large valve by admitting fluid of a motor bellows or piston actuating the large valve, the small valve is universally recognized as a pilot valve. Air valves 64, 65 and 66 are pilot means for governing processing operations. The nozzle 48, disposed adjacent timer cam 44, also acts as a pilot means for governing the servo motor-bellows 52 to cause the movable end thereof, and controlling member 61, to move in correspondence with the portion of cam 44 then adjacent the outlet of nozzle 48.

The terms and expressions which we have employed are used as terms of description and not of limitation, and we have no intention, in the use of such terms and expressions, of excluding any equivalents of the features shown and described and portions thereof, but recognize that various modifications are possible within the scope of invention claimed.

We claim:

1. In a timer for a cyclically operated processing apparatus, a time-operated cam, a control member, means operated by said control member for regulating the operation of said apparatus, pilot means movable in unison with said control member for governing the operation thereof, and a servomotor governed by said pilot means and operatively connected with said control member to position the latter in correspondence with the position of a then-adjacent portion of said cam.

2. In a controlling system for a press for heat-treating hollow articles, the combination with means for governing the closing and opening of the press, means for actuating said governing means, means for controlling the supply of a hot inflating fluid under pressure to such hollow articles and the exhausting of such fluid therefrom: of pilot means operatively connected with and governed by said fluid controlling means to cause the operation of said press-opening governing means to a position to initiate the opening of the press only after said fluid-supply controlling means has been closed and said fluid-exhaust controlling means has been connected to drain, and means operatively connected to said pilot means for delaying the operation of the means governing the opening of the press for a safe interval subsequent to the closing of the means controlling the supply of the pressure fluid and the opening of the means controlling the exhausting of such fluid to drain.

3. In a controlling system for safely operating a press for vulcanizing hollow articles, and including a timer, an air-supply, a plurality of air-valves connected with said air-supply for governing timed operations of the press in a predetermined sequence and operated by said timer, means for controlling the closing and opening of the press, means for controlling the supply of a hot inflating fluid under pressure to such hollow articles and the exhausting of such fluid therefrom, biased diaphragms for operating said controlling means, and pressure lines connecting said air-valves and said diaphragms, said means for controlling the operation of the press being arranged to cause the press to close upon a lowering of the pressure of air in the line to its diaphragm, the combination of air-valve means in the line connecting the diaphragm of said press-controlling means with its respective governing air-valve and opened in accordance with the air-presures in the lines to the diaphragms of the fluid-controlling means to cause the operation of said press-opening governing means to a position to initiate the opening of the press only after such air-pressures are such that said fluid-supply controlling means has been closed and said fluid-exhaust controlling means has been connected to drain by said timer; and means, also in the line to the diaphragm of said press-controlling means between said diaphragm and said air-valve means, for delaying the response of the air-pressure in such line upon the opening of said air-valve means and hence the operation of the means governing the opening of the press for a safe interval subsequent to the timed closing of the means controlling the supply of the pressure fluid and the timed opening of the means controlling the exhaust of such fluid to the drain.

4. The steps in the method of cyclically operating, by a timer, presses for vulcanizing hollow tires, which comprise manually starting the running of the timer to a position to cause the presses to close and to open valve means for supplying at least one inflating fluid and to operate valve means to alter the connection of the fluid exhaust from the tires from drain to circulate, continuing the running of the timer in accordance with a physical condition of the fluid in the exhaust line from the tires subject to the closure of all presses, shutting off the supply of inflating fluid and opening the exhaust to drain near the end of the cycle, still later operating means governing the opening of the presses, and upon the completion of a cycle stopping the timer at its next starting position and opening the presses only at a safe interval after the inflating fluid supply and exhaust valves have reached their last-named positions, said opening being governed by the positions of said valves.

5. In a controlling system for a press for heat-treating hollow articles including a supply of hot inflating fluid for the latter, the combination with means for governing the closing and opening of the press, means for actuating said press-governing means, and means for controlling the supply of a hot inflating fluid under pressure to such hollow articles and the exhausting of such fluid therefrom: of means responsive to the temperature of the exhaust fluid, pilot means operatively connected with said fluid controlling means and said temperature responsive means to cause the operation of said press-opening governing means to a position to initiate the opening of the press only after said fluid-supply controlling means has been closed, said fluid-exhaust controlling means has been connected to drain, and the temperature responsive means has attained a position corresponding with a low safe exhaust temperature, and means operatively connected to said pilot means for delaying the operation of the means governing the opening of the press for a safe interval subsequent to the closing of the means controlling the supply of the pressure fluid and the opening of the means controlling the exhausting of such fluid to drain.

6. In a controlling system for a press for heat-treating hollow articles including a supply of hot inflating fluid for the latter, a plurality of means for respectively controlling the supply of a hot inflating fluid under pressure to such hollow articles and the exhausting of such fluid therefrom, means for controlling the closing and opening of the press, pilot means for governing said controlling means, a timer including a control member arranged to operate said pilot means, a cam, a motor for operating said cam, an air supply including a feeder resistance, a bellows connected to said air supply downstream of said resistance and having one end fixed and the other end positionable in correspondence with the air-pressure in said bellows, a nozzle adjacent said cam and pressure-connected to said bellows to bleed the air therefrom and mechanically connected to the positionable end thereof to coact with a then adjacent edge portion of said cam; said cam, bellows and nozzle being adapted and arranged to position said control member in substantial correspondence with the position of the then-coacting edge portion of said cam as long as said air supply is connected; a cock in said air-supply; and interlocking pilot means operatively connected with and governed by said fluid controlling means to cause the operation of said press-opening controlling means to a position to initiate the opening of the press only after said fluid-supply controlling means has been closed and said fluid-exhaust controlling means has been connected to drain.

7. In a system for safely controlling a press for heat-treating hollow articles, a timer comprising a cam, a motor for driving said cam, a controlling member operated by said cam, and pilot means operated by said member; means for governing the operation of the press, means for supplying a hot vulcanizing fluid to the interior of the hollow article, and means for exhausting the fluid from the hollow article, all governed by said pilot means; interlocking means operatively connecting the fluid controlling means with the press-operation governing means; manually operable switch means electrically connected with said motor for advancing said cam to a press closing and hot fluid supplying position; an element actuated in accordance with the exhaust temperature; and switch means operated by said element and said cam for continuing the operation of said timer after the exhaust temperature has reached a determinate minimum value; and a running switch arranged to cause said timer to operate continuously thereafter throughout its complete cycle, a portion of said cam being constructed and arranged to open said running switch upon the completion of the cycle of operation; said interlocking means being governed by the response of all of the stated means governed by said pilot means and including a delaying portion and being adapted and arranged to cause the operation of said press-governing means to a position to initiate the opening of the press only for a predetermined interval after said fluid supplying means is closed and said fluid exhausting means is opened to drain.

8. In a system for safely controlling a press for heat-treating hollow articles, a timer comprising a cam, a motor for driving said cam, a controlling member, a pilot means having a portion adjacent said cam and operated in unison with said controlling member relative to a then-adjacent edge portion of said cam, a servo-motor means operatively connecting said pilot means and said controlling member to position the latter in correspondence with the portion of the cam edge then adjacent said pilot means, and other pilot means operated by said member; means for governing the operation of the press, means for supplying a hot vulcanizing fluid to the interior of the hollow article, and means for exhausting the fluid from the hollow article, all governed by said second mentioned pilot means; interlocking means operatively connecting the fluid controlling means with the press-operation governing means; said interlocking means being governed by said fluid controlling means to cause the operation of said press-governing means to a position to initiate the opening of the press only after said fluid supplying means is closed and said fluid exhausting means is opened to drain.

9. In a controlling system for operating a press for vulcanizing a hollow article, a timer including a cam, a motor for driving said cam, a controlling member operated by said cam, and pilot means operated by said member; means for governing the operation of the press, fluid controlling means for supplying a hot vulcanizing fluid to the interior of the hollow article, and fluid controlling means for exhausting the fluid from the hollow article, all governed by said pilot means; interlocking means operatively connecting the fluid controlling means with the press-operation governing means; manually operable switch means electrically connected with said motor for advancing said cam to a press closing and hot fluid supplying position; an element actuated in accordance with the temperature of the exhaust fluid, and switch means operated by said element for continuing the operation of said timer after the exhaust temperature has reached a determinate minimum value; and a running switch arranged to cause said timer to operate continuously thereafter throughout its complete cycle, a portion of said cam being constructed and arranged to open said running switch upon the completion of the cycle of operation; said interlocking means being governed by the fluid controlling means to cause the operation of said press-governing means to a position to initiate the opening of the press only after said fluid supplying means is closed and said fluid exhausting means is opened to drain.

10. In a controlling system for a press for heat-treating hollow articles, the combination with means for governing the closing and opening of the press, means for actuating said press-governing means, and fluid controlling means for controlling the supply of a hot inflating fluid under pressure to such hollow articles and the fluid-exhaust controlling means for controlling the exhausting of such fluid therefrom; of a member for governing the press-governing means and the fluid-controlling means, means responsive to the temperature of the exhaust fluid, pilot means operatively connected with and governed by said fluid controlling means and said temperature responsive means to cause the operation of said press-opening governing means to a position to initiate the opening of the press only after the fluid-supply controlling means has been closed, said fluid-exhaust controlling means has been closed, said fluid-exhaust controlling means has been connected to drain and after the temperature responsive means attains a position corresponding with the low safe exhaust temperature, and means operatively connected to said pilot means for delaying the operation of the means governing the opening of the press for a safe interval subsequent to the closing of the means controlling the supply of the pressure fluid and the opening of the means controlling the exhausting of such fluid to drain.

11. In a controlling system for safely operating a press for vulcanizing hollow articles, the combination of means for supplying a hot inflating fluid to the interior of the hollow article, means for connecting the exhaust from the hollow article to a drain, a plurality of power means for operating the fluid supplying and exhausting means, means for governing the opening and closing of the press and power means for operating such means, the press-governing means and the power means therefor being adapted to maintain said press closed in the absence of power for such power means, and means operatively connected to the first named power means and sensitive to the power condition thereof to cut off the supply of power to the second named power means after the power condition of each of the first named power means is such that the fluid supplying means has been closed and the fluid exhaust means has been connected to drain.

12. The combination set forth in claim 11 including a timer for cyclically operating the system having an air-valve, a cam coacting therewith and movable relatively thereto and an electrical motor for driving said cam, a bellows operatively connected to said air-valve to position the latter as required by said cam, and a member and air-valves controlled thereby for governing said power means which are air-operated, said member being biased toward its position for the start of a cycle and positionable by said bellows in correspondence with the first named air-valve while air is supplied thereto; a manually-operable valve for shutting off the air supply to said air-valves; and manually-operable switch means for said motor for advancing said cam to a press closing and hot fluid supplying position, switch means for said motor having a portion sensitive to the exhaust temperature and a portion actuated by said cam for continuing the operation of the timer only in case such temperature is at a predetermined minimum value at a predetermined time and for a minimum duration thereafter, and a running switch for said motor and coacting with said cam to cause the timer to operate continuously after the end of such duration through the remainder of its complete cycle and to then stop automatically.

13. In a timer system for safely and cyclically operating a press for vulcanizing hollow articles, the combination of a member for controlling the operation of the press and the flow of inflating fluid to and from the interior of each article progressively in a safe sequence and in accordance with its position, means continuously biasing said member toward its position at the start of the cycle, power means for displacing said member from the starting position thereof, a pilot for said power means and movable with said member, and a cam movable at constant speed relative to said pilot, said pilot and its power means being constructed and arranged to cause said pilot to move transversely to the direction of motion of the cam to follow the edge thereof and without hindering such motion.

14. In an apparatus including a press for heat-processing hollow articles and having means for closing and opening the press and means for supplying hot inflating fluid under pressure to the interior of said hollow articles and for exhausting said fluid therefrom, the combination of fluid pressure means for governing said means for closing and opening said press, valves for controlling the supplying and exhausting of said fluid through the second named means, fluid pressure means for actuating said valves, and means actuated by the last named fluid pressure means for controlling the operation of the first named fluid pressure means.

15. In an apparatus including a press for heat-processing hollow articles and having means for closing and opening the press and means for supplying hot inflating fluid under pressure to the interior of said hollow articles and for exhausting said fluid therefrom, the combination of power means for governing said means for closing and opening said press, pilot means for controlling the supplying of power to said power means, valves for controlling the supplying and exhausting of said fluid through the second named means, power means for operating said valves, pilot means for controlling the supplying of power to the last named power means, and additional pilot means in series with the first named pilot means and cooperating with said first named pilot means to control the operation of the first named power means, said additional pilot means being actuated by the second named power means.

16. The combination set forth in claim 15 in which each of said valves has a stem, the additional pilot means actuated by the second named power means comprises a plurality of pilot means each of which is directly actuated by one of said stems, and including a timer for actuating the first named and second named pilot means in a predetermined timed relation.

PAUL F. K. ERBGUTH.
ROLF A. F. SANDBERG.
ED S. SMITH, JR.